United States Patent Office 3,481,209
Patented Dec. 2, 1969

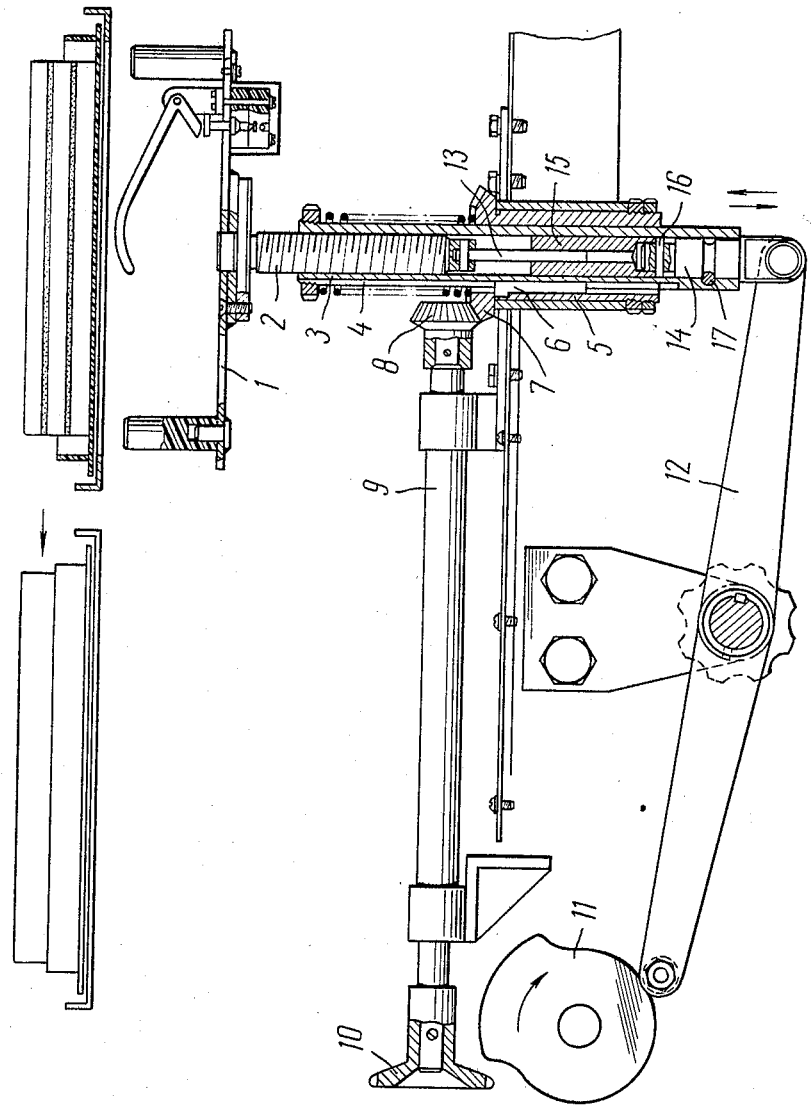

3,481,209
LIFT-DROP TABLE FOR CAKE MAKING APPLIANCES, MORE SPECIFICALLY TO CAKE DRESSING APPLIANCES
Oleg Grigorievich Lunin, Zeleny Prospekt, 24/26, korpus 27, kv. 17, Moscow, U.S.S.R.
Filed Feb. 28, 1967, Ser. No. 619,292
Int. Cl. F16h 29/20
U.S. Cl. 74—89.15      2 Claims

ABSTRACT OF THE DISCLOSURE

A lift-drop table for supporting cakes at the desired height for icing or dressing operations including a screw attached to the table and which screw engages a thread provided in a bushing and means for rotating the bushing for additionally lifting or dropping the table. Moreover, cam operated means are provided to lift or drop the bushing and hence the table.

---

The present invention relates to appliances for icing or dressing cakes and more specifically, to lift-drop appliances for positioning cakes at the proper height for the dressing thereof.

Known in the art are lift-drop tables for cake blanks in which the cake dressing appliances are fixed on the rods actuated by cams with the aid of a lever arrangement. (U.S.S.R. inventor's certificate No. 125,208, Class 2b, 17.) A disadvantage of these tables is the impossibility to control the height of the lift and drop in the course of their movement.

The object of the invention is to provide a lift-drop table capable of being cotnrolled as to the height of the lift and drop in the course of movement.

This object is achieved by providing a lift-drop table fastened to a rod which, includes a screw moving in the internal thread of a bushing placed in rotation to additionally lift or drop the table.

The bushing drive for the additional lifting and dropping of the table is a bevel gearing in which the pinion is fitted onto a shaft provided with a handle, while the bevel wheel is fitted on a hollow shaft, with the bushing entering the shaft and connected thereto via a key.

Further objects and advantages of the invention will become more fully apparent to persons skilled in the art from the following specification and annexed drawing in which the sole figure is a veiw of an embodiment of the table partly in elevation and partly in cross section.

A lift-drop table 1 is fastened to a screw 2 which engages an internal thread of a bushing 3 to constitute a screw pair. The bushing 3 is positioned in a hollow shaft and is connected thereto by means of a slot 4 in the bushing and a key 6.

Mounted on the outer surface of the upper end of the shaft 5 is a bevel wheel 7 which meshes with a bevel pinion 8 attached to one end of a horizontal shaft 9 supported in suitable journals for rotary movement. The shaft 5 is rotated by the manipulation of a handle 10 attached to the upper end thereof.

The automatic lift and drop of the table 1 is effected by means of a cam 11 via a lever 12 pivoted intermediate its end and connected at its free end with the lower end of a rod 13 through a shackle 14. The shackle 14 is hingedly coupled with the lever 12. The rod 13 passes through a guide bushing 15 which is connected with the shackle 14 by a cross pin 16. The shackle 14 is coupled with the bushing 3 by means of a ring 17. The regulation of the height of the table 1, that is additional lift or drop, is as follows.

Upon turning the handle 10, the shaft 9 and the bevel pinion 8 rotate and due to the bevel wheel 7, rotation is imparted to the hollow shaft 5. The rotation the same will execute only progressive motion upwardly and downwardly with respect to the center line of the bushing 3. Hence, a change of the lift or drop of the table 1 occurs, with the latter being effected by the cam 11 and the lever 12.

The regulation of the moving table 1 as to the height thereof is necessary in order to achieve a uniform application of the design onto cake flanks of different heights in the dressing operations.

The table can be also employed in automatic packing appliances.

I claim:
1. An appliance for cake dressing operations comprising a lift-drop table, a screw attached to and depending from said table, a bushing having an internal thread receiving said screw, and drive means to rotate the bushing to additionally lift or drop the table, said drive means including a rotatable shaft, a handle at one end of the shaft for imparting rotation thereto, a bevel pinion at the other end of the shaft, a hollow shaft receiving said bushing, a key connecting said hollow shaft and bushing, and a bevel wheel on said hollow shaft in mesh with said bevel pinion.

2. An appliance for cake dressing operations comprising a lift-drop table, a screw attached to and depending from said table, a bushing having an internal thread receiving said screw, an element within the bushing connected to the screw, means mounting the element within the bushing against relative axial movement between the screw and the element yet permitting rotary movement of the bushing, cam operated means operably coupled to said mounting means to lift or drop the bushing and hence the table, and drive means operably connected to said bushing to rotate the bushing to additionally lift or drop the table.

References Cited

UNITED STATES PATENTS

| | | | |
|---|---|---|---|
| 669,769 | 3/1901 | Smith | 107—27 |
| 1,014,874 | 1/1912 | Herisse | 107—27 |
| 2,638,800 | 5/1953 | Frushour | 77—63.6 |

FRED C. MATTERN, Jr., Primary Examiner

F. D. SHOEMAKER, Assistant Examiner

U.S. Cl. X.R.

107—27